US009710128B2

(12) United States Patent
Kauffmann (10) Patent No.: US 9,710,128 B2
(45) Date of Patent: Jul. 18, 2017

(54) DYNAMIC ICONS FOR GESTURE DISCOVERABILITY

(71) Applicant: Google Inc., Mountain View, CA (US)

(72) Inventor: Alejandro Jose Kauffmann, San Francisco, CA (US)

(73) Assignee: Google Inc., Mountain View, CA (US)

( * ) Notice: Subject to any disclaimer, the term of this patent is extended or adjusted under 35 U.S.C. 154(b) by 241 days.

(21) Appl. No.: 14/660,270

(22) Filed: Mar. 17, 2015

(65) Prior Publication Data

US 2016/0274735 A1  Sep. 22, 2016

(51) Int. Cl.
| | |
|---|---|
| G06F 3/048 | (2013.01) |
| G06F 3/0481 | (2013.01) |
| G06F 9/44 | (2006.01) |
| G06F 3/01 | (2006.01) |
| G06F 3/0488 | (2013.01) |

(52) U.S. Cl.
CPC ............ *G06F 3/0481* (2013.01); *G06F 3/017* (2013.01); *G06F 3/048* (2013.01); *G06F 3/04883* (2013.01); *G06F 9/4446* (2013.01); *G06F 2200/1637* (2013.01)

(58) Field of Classification Search
CPC .. G06F 3/017; G06F 3/04883; G06F 3/04895; G06F 9/4446; G06F 1/1615; G06F 1/1694
See application file for complete search history.

(56) References Cited

U.S. PATENT DOCUMENTS

| | | | |
|---|---|---|---|
| 8,444,464 B2 * | 5/2013 | Boch .................. | G06F 3/011 463/7 |
| 8,839,150 B2 | 9/2014 | King | |
| 2005/0219223 A1 | 10/2005 | Kotzin et al. | |
| 2009/0066646 A1 | 3/2009 | Choi | |

(Continued)

FOREIGN PATENT DOCUMENTS

EP  2749985  7/2014

OTHER PUBLICATIONS

International Search Report and Written Opinion in International Application No. PCT/US2016/015950, mailed May 20, 2016, 12 pages.

*Primary Examiner* — Dino Kujundzic
(74) *Attorney, Agent, or Firm* — Fish & Richardson P.C.

(57) ABSTRACT

Methods, systems, and apparatus, including computer programs encoded on a computer storage medium, for providing gesture discoverability with a mobile computing device. In one aspect, a method include actions of obtaining gesture definition data for a particular gesture. The gesture definition data specifies a predefined onset position associated with commencement of the particular gesture, a predefined motion associated with completion of the particular gesture, a particular action that is triggered upon the completion of the particular gesture, and a visual indicator for visually indicating a progress toward the completion of the particular gesture as the predefined motion is performed. Additional actions include determining that an orientation of a mobile computing device matches the onset position of the particular gesture, providing the visual indicator, determining a motion, determining whether the motion matches the predefined motion, and determining whether to update the visual indicator.

14 Claims, 5 Drawing Sheets

(56) References Cited

U.S. PATENT DOCUMENTS

| | | | |
|---|---|---|---|
| 2009/0191968 A1* | 7/2009 | Johnson | A63F 13/10 463/37 |
| 2010/0156812 A1 | 6/2010 | Stallings | |
| 2011/0098109 A1* | 4/2011 | Leake | A63F 13/213 463/30 |
| 2011/0117535 A1* | 5/2011 | Benko | G06F 3/04883 434/365 |
| 2014/0187204 A1* | 7/2014 | Hartmann | G06F 21/316 455/411 |
| 2015/0286328 A1* | 10/2015 | Lee | G06F 3/0412 345/173 |

\* cited by examiner

DYNAMIC ICONS FOR GESTURE DISCOVERABILITY

TECHNICAL FIELD

This disclosure generally relates to mobile computing devices, and one particular implementation relates to using gestures to control mobile computing devices.

BACKGROUND

A mobile computing device may perform actions in response to a user making a gesture using the mobile computing device. For example, a mobile computing device may include an application that displays dice, where the dice are rolled whenever the mobile computing device is shaken. In some cases, users of the mobile computing device may be unaware of the gestures that may be used to cause the mobile computing device to perform an action.

SUMMARY

In general, an aspect of the subject matter described in this specification may involve a process for providing gesture discoverability using a mobile computing device. The process may inform a user of the mobile computing device that making a particular gesture with the mobile computing device may trigger an action. The particular gesture may include moving the mobile computing device from a predefined onset position with a predefined motion. For example, a particular gesture may include holding the mobile computing device upright and twisting the mobile computing device ninety degrees to trigger an action of answering a phone call.

The mobile computing device may provide gesture discoverability by providing feedback to the user so that the user may be intuitively guided to perform the particular gesture. For example, for an action of answering a phone call by twisting the mobile computing device, the mobile computing device may display a visual indicator, e.g., an icon or symbol, representing a door that progressively opens as the mobile computing device is twisted.

The visual indicator displayed for a particular gesture may be a representation of one or more physical objects whose motion in free space is associated with the predefined onset position and the predefined motion for the particular gesture. For example, a visual indicator for the particular gesture of twisting the mobile computing device ninety degrees may represent a door that opens as the mobile computing device is twisted, a visual indicator for a particular gesture of holding a mobile computing device upright and turning the mobile computing device upside down may represent a bottle that is poured as the mobile computing device is turned upside down, and a visual indicator for a particular gesture of shaking a mobile computing device may represent a salt shaker that is emptied as the mobile computing device is shaken. Accordingly, the visual indicators provided by a mobile computing device may enable users to intuitively learn gestures that trigger the mobile computing device to perform various actions.

In some aspects, the subject matter described in this specification may be embodied in methods that may include the actions of obtaining gesture definition data for a particular gesture. The gesture definition data may specify a predefined onset position associated with commencement of the particular gesture, a predefined motion associated with completion of the particular gesture, a particular action that is triggered upon the completion of the particular gesture, and a visual indicator for visually indicating a progress toward the completion of the particular gesture as the predefined motion is performed. The visual indicator may include a representation of one or more physical objects whose motion, in free space, is associated with the same predefined motion. Additional actions may include determining that an orientation of a mobile computing device matches the onset position of the particular gesture and in response to determining that the orientation of the mobile computing device matches the predefined onset position of the gesture, providing, on a graphical user interface of the mobile computing device, the visual indicator. Further actions may include determining a motion of the mobile computing device, determining whether the motion of the mobile computing device matches the predefined motion, and in response to determining whether the motion of the mobile computing device matches the predefined motion, determining whether to update the visual indicator to indicate the progress toward completion of the particular gesture.

Other versions include corresponding systems, apparatus, and computer programs, configured to perform the actions of the methods, encoded on computer storage devices.

These and other versions may each optionally include one or more of the following features. For instance, in some implementations determining whether the motion of the mobile computing device matches the predefined motion includes determining that the motion of the mobile computing device completes the particular gesture and in response to determining that the motion of the mobile computing device completes the particular gesture, triggering the particular action.

In some aspects, providing, on a graphical user interface of the mobile computing device, the visual indicator, includes providing the visual indicator in an active state that indicates that the orientation of the mobile computing device matches the predefined onset position of the particular gesture. Providing, on a graphical user interface of the mobile computing device, the visual indicator, may include updating the visual indicator from an inactive state, that indicates that the orientation of the mobile computing device does not match the predefined onset position of the particular gesture, to the active state.

In certain aspects, determining whether to update the visual indicator to indicate the progress toward completion of the particular gesture includes determining to update the visual indicator to indicate an increase in the progress toward completion of the particular gesture based on a determination that the motion of the mobile computing device matches the predefined motion.

In some implementations, determining whether to update the visual indicator to indicate the progress toward completion of the particular gesture includes determining to update the visual indicator to indicate an inactive state that indicates that the orientation of the mobile computing device does not match the particular gesture based on a determination that the motion of the mobile computing device does not match the predefined motion.

In some aspects, the particular gesture includes holding the mobile computing device upright and turning the mobile computing device counter-clockwise until the mobile computing device is upside down, and the visual indicator includes a representation of a bottle being poured.

The details of one or more implementations of the subject matter described in this specification are set forth in the accompanying drawings and the description below. Other

DESCRIPTION OF DRAWINGS

Like reference symbols in the various drawings indicate like elements.

DETAILED DESCRIPTION

Figure 1A:
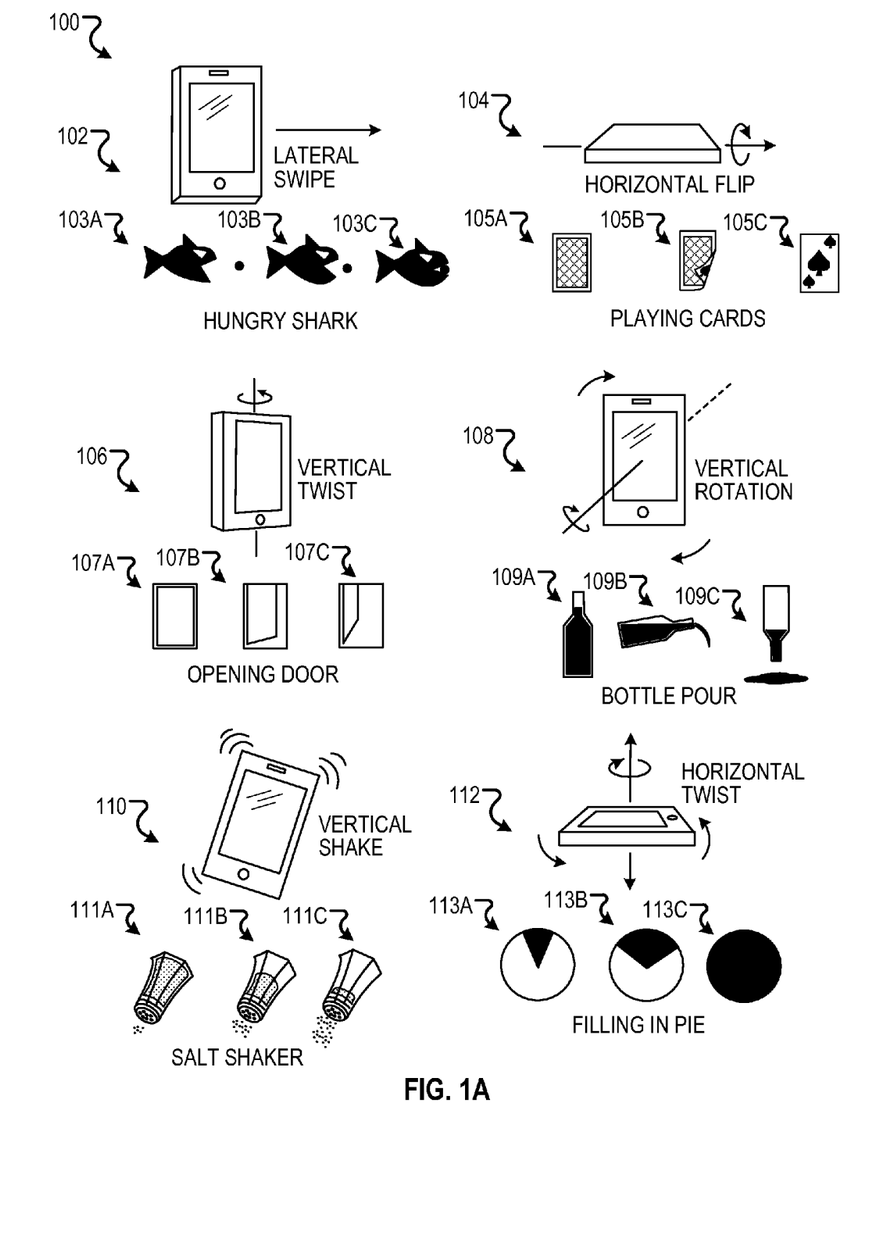
FIGS. 1A and 1B are illustrations of example visual indicators associated with example gestures made with a mobile computing device.

FIG. 1A is an illustration 100 of example visual indicators associated with example gestures made with a mobile computing device. As discussed above, the visual indicators may be representations of one or more physical objects whose motion in free space is associated with a predefined onset position and a predefined motion of a particular gesture that is made with the mobile computing device. The mobile computing device may update the visual indicators as progress towards completion of the particular gesture changes, and completion of the particular gesture may trigger the mobile computing device to perform a particular action. Briefly, and as described in further detail below, the illustration 100 includes visual indicators 102, 104, 106, 108, 110, and 112 that are associated with different example gestures made with a mobile computing device.

The visual indicator 102 may be associated with a particular gesture with a predefined onset position of orienting the mobile computing device upright, and a predefined motion of moving the mobile computing device in a lateral direction to the right. The visual indicator 102 represents a shark and a pellet to the right of the shark 103A. As the mobile computing device is held upright and moved to the right, the shark is shown moving closer to the pellet 103B. When the predefined motion is completed, e.g., the mobile computing device moved a predetermined amount to the right, the shark is shown eating the pellet 103C.

The visual indicator 104 may be associated with a particular gesture with a predefined onset position of orienting the mobile computing device face-down, and a predefined motion of flipping the mobile computing device along the length of the mobile computing device. The visual indicator 104 represents a face-down playing card 105A. As the mobile computing device is flipped, the face-down playing card is shown being turned face-up 105B. When the predefined motion is completed, e.g., the mobile computing device flipped completely face-up, the playing card is shown completely face-up 105C.

The visual indicator 106 may be associated with a particular gesture with a predefined onset position of orienting the mobile computing device upright, and a predefined motion of twisting the mobile computing device ninety degrees while keeping the mobile computing device upright. The visual indicator 106 represents a closed door 107A. As the mobile computing device is twisted, the door is shown opening 107B. When the predefined motion is completed, e.g., the mobile computing device twisted ninety degrees, the door is shown completely open 107C.

The visual indicator 108 may be associated with a particular gesture with a predefined onset position of orienting the mobile computing device upright, and a predefined motion of rotating the mobile computing device one hundred eighty degrees along an axis orthogonal to a display of the mobile computing device. The visual indicator 108 represents a bottle filled with liquid 109A. As the mobile computing device is rotated, the bottle is shown being rotated so that liquid pours from the bottle 109B. When the predefined motion is completed, e.g., the mobile computing device turned completely upside down, the bottle is shown upside down and empty 109C.

The visual indicator 110 may be associated with a particular gesture with a predefined onset position of orienting the mobile computing device at a slight angle, and a predefined motion of shaking the mobile computing device. The visual indicator 108 represents a salt shaker filled with salt 111A. As the mobile computing device is shaken, the salt shaker is shown with progressively less salt 111B. When the predefined motion is completed, e.g., the mobile computing device shaken for a predetermined amount of time, the salt shaker is shown empty 111C.

The visual indicator 112 may be associated with a particular gesture with a predefined onset position of orienting the mobile computing device flat, and a predefined motion of spinning the mobile computing device three hundred and sixty degrees. The visual indicator 112 represents an unfilled pie 113A. As the mobile computing device is spun, the pie is shown being progressively filled 113B. When the predefined motion is completed, e.g., the mobile computing device spun three hundred and sixty degrees, the pie is shown completely filled 113C.

The visual indicators may be associated with the same actions or with different actions. For example, the visual indicator 102 may be associated with closing a screen on a graphical user interface, the visual indicator 104 may be associated with opening a selected file, the visual indicator 106 may be associated with answering a call, the visual indicator 108 may be associated with transferring a file, the visual indicator 110 may be associated with randomly selecting an item, and the visual indicator 112 may be associated with rotating a view on a display. In another example, two or more of the visual indicators 102, 104, 106, 108, 110, and 112 may be associated with an action of closing a screen.

The visual indicators may initially represent physical objects at an orientation that corresponds to an onset position for a particular gesture associated with the visual indicator. For example, the visual indicator 102 initially represents an upright shark, the visual indicator 104 initially represents a face-down playing card, the visual indicator 106 initially represents an upright door, the visual indicator 108 initially represents an upright bottle, the visual indicator 110 initially represents a tilted salt shaker, and visual indicator 112 initially represents a face up pie.

In some implementations, other visual indicators may be associated with other gestures. For example, a visual indicator of a bell with a rope may be associated with a particular gesture of vertically swiping the mobile computing device downwards while holding the mobile computing device upright, and a visual indicator of a book shown below a bookshelf may be associated with a particular gesture of swiping the mobile computing device upwards.

Figure 1B:
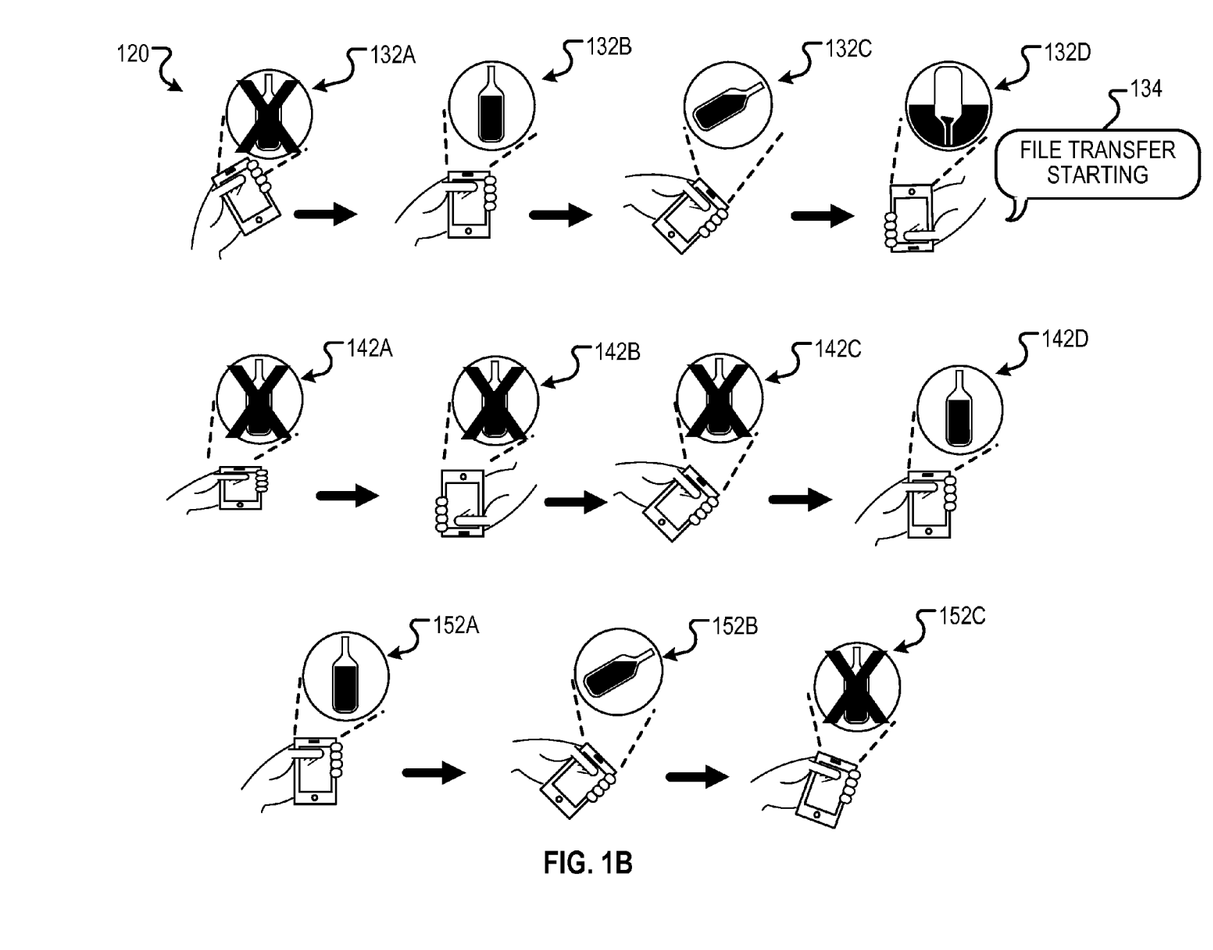

FIG. 1B is an illustration 120 of a visual indicator being updated based on motion of a mobile computing device. In some implementations, the visual indicators may be displayed in an inactive state or in an active state. An inactive state may indicate that progress towards completion of a particular gesture has not begun as the orientation of the mobile computing device has not matched a predefined onset position of the particular gesture. The mobile computing device may display a visual indicator in an inactive state until the mobile computing device is oriented to match a predefined onset position, at which point the visual indicator is shown in an active state. The mobile computing device may possibly not update a visual indicator in an inactive state until the mobile computing device is oriented to match the predefined onset state. For example, a visual indicator in an inactive state may be static until the visual indicator is updated to an active state. A visual indicator may be represented in an inactive state by an "X" across the visual indicator, being greyed out, being shaded in red, being cross-hatched, or some other signal.

An active state may indicate that the orientation of the mobile computing device has matched a predefined onset position of the particular gesture. A visual indicator in the active state may be updated so that the one more physical objects represented by the visual indicator change as the mobile computing device is moved. For example, the visual indicator may represent a door opening as the mobile computing device is twisted. In some implementations, when movement of the mobile computing device from a predefined onset position does not match a predefined motion, the mobile computing device may determine the mismatch, and in response, update the visual indicator to an inactive state.

Briefly, and as described in further detail below, the illustration 120 includes representations 132A-D, 142A-D, and 152A-D of a visual indicator that is associated with a particular gesture. The particular gesture may be associated with a predefined onset position of orienting the mobile computing device upright, and a predefined motion of turning the mobile computing device upside down, e.g., rotating the mobile computing device one hundred eighty degrees along an axis orthogonal to a display of the mobile computing device.

The representations 132A-D show how a visual indicator may be updated while a mobile computing device is oriented to match the particular gesture and moved according to the predefined motion associated with the particular gesture. Representation 132A illustrates a visual indicator in inactive state when the mobile computing device is held tilted from an upright position. The representation 132A may represent the bottle in an upright orientation which may provide an intuitive suggestion to a user that the mobile computing device should be held in an upright orientation as an onset position.

Representation 132B illustrates the visual indicator in an active state when the orientation of the mobile computing device matches the onset position of the particular gesture. Representation 132B represents a bottle in an upright orientation that matches an orientation of the mobile computing device.

Representation 132C illustrates the visual indicator in an active state while motion of the mobile computing device matches the particular gesture. Representation 132C represents a bottle at a forty-five degree angle that matches a forty-five degree angle of the mobile computing device.

Representation 132D illustrates the visual indicator in an active state when the particular gesture is completed. Representation 132D represents an upside down bottle that matches an upside down orientation of the mobile computing device. When the particular gesture is completed, the mobile computing device may also provide a notification that a particular action associated with the particular gesture is completed. For example, a notification 134 may be an audio or visual output of "File Transfer Starting" after completion of a predefined gesture associated with a particular action of triggering a file transfer.

Representation 142A illustrates a visual indicator in an inactive state when the mobile computing device is held tilted away from a user, which does not match the onset position of holding the mobile computing device upright. Representation 142B illustrates that the visual indicator is unchanged in the inactive state when the mobile computing device is moved to be upside down. Representation 142C illustrates that the visual indicator is still unchanged in the inactive state when the mobile computing device is moved to be tilted. Representation 142D illustrates that the visual indicator is updated to the active state when the mobile computing device is moved so that the orientation of the mobile computing device matches the onset position.

Representation 152A illustrates the visual indicator in an active state when the orientation of the mobile computing device matches the onset position of the particular gesture. Representation 152B illustrates the visual indicator in an active state while motion of the mobile computing device matches the particular gesture. For example, representation 152B represents a bottle at a forty-five degree angle that matches a forty-five degree angle of the mobile computing device. Representation 152C illustrates the visual indicator in an inactive state when motion of the mobile computing device from the onset position does not match the particular gesture. For example, representation 152C may be shown when the mobile computing device is moved back towards an upright position, which does not match a particular gesture of turning the mobile computing device upside down.

While the illustration 120 includes representations 132A-D, 142A-D, and 152A-D that correspond to visual indicator 108 shown in FIG. 1, representations representing active and inactive states may similarly be shown for other visual indicators. For example, the visual indications 102, 104, 106, 108, 110, 112 may all be shown in inactive representations based on displaying the representations labeled with (A) overlaid with an "X," shaded in red, cross-hatched or with some other signal.

Figure 2:
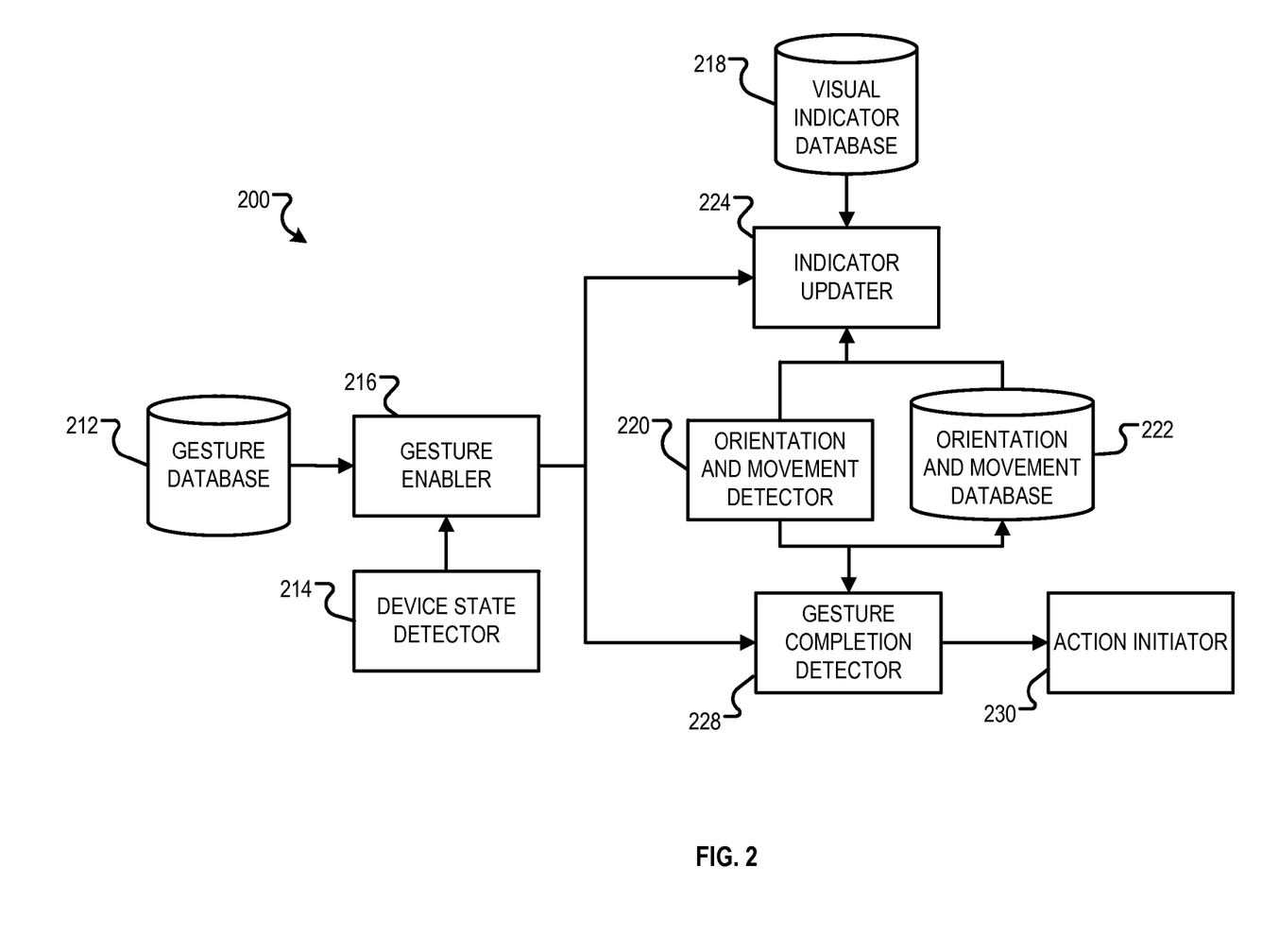
FIG. 2 is a block diagram of an example system for providing gesture discoverability with a mobile computing device.

FIG. 2 is a block diagram of an example system 200 for providing gesture discoverability with a mobile computing device. Briefly, and as described in further detail below, the system 200 may include a gesture database 212, a device state detector 214, a gesture enabler 216, a visual indicator database 218, an orientation and movement detector 220, an orientation and movement database 222, an indicator updater 224, a gesture completion detector 228, and an action initiator 230.

The gesture database 212 may be a data store that stores gesture definition data for one or more particular gestures. The gesture definition data for each particular gesture may specify a predefined onset position associated with commencement of the particular gesture, a predefined motion associated with completion of the particular gesture, a particular action that is triggered upon the completion of the particular gesture, and a visual indicator for visually indicating a progress toward the completion of the particular gesture as the predefined motion is performed.

For example, the gesture definition data for a particular gesture may specify a predefined onset position of orienting the mobile computing device upright, a predefined motion of moving the mobile computing device in a lateral direction to the right by six inches, a particular action of closing a current window, and a visual indicator that represents a shark progressively eating a pellet. In another example, the gesture definition data for another particular gesture may specify a predefined onset position of orienting the mobile computing device face-down, a predefined motion of flipping the mobile computing device upright along the length of the mobile computing device, a particular action of opening a selected item, and a visual indicator that represents a face-down playing card progressively turning face-up. Other gesture definition data for other gestures may specify different predefined onset positions, different predefined motions, different particular actions, or different visual indicators.

The predefined onset position may be stored in the gesture database 212 as particular accelerometer and magnetic sensor readings. For example, the particular accelerometer and magnetic sensor readings may represent an upright mobile computing device. The predefined motion may be stored in the gesture database 212 as a sequence of accelerometer and magnetic sensor readings or a sequence of orientations and positions of the mobile computing device. For example, the predefined motion may include a sequence of orientations and positions of the mobile computing device that correspond with accelerometer and magnetic sensor readings of a mobile computing device being at various stages of being turned upside down.

The device state detector 214 may detect a state of a mobile computing device. For example, the device state detector 214 may detect that the mobile computing device is in a state of receiving a phone call or a state of having an item selected by a user in a graphical user interface. In another example, the device state detector 214 may detect that the mobile computing device is in a state of enabling the user to initiate a file transfer. The device state detector 214 may include software components that monitor the state of the mobile computing device. For example, the device state detector 214 may include software that monitors when the mobile computing device is receiving a phone call. The device state detector 214 may provide an indication of the state of the mobile computing device to the gesture enabler 216. For example, the device state detector 214 may indicate that the mobile computing device is in a state of receiving a phone call.

The gesture enabler 216 may determine to enable the mobile computing device to trigger one or more particular actions using a predefined gesture made with the mobile computing device. For example, the gesture enabler 216 may determine to enable the mobile computing device to trigger an action of closing a currently displayed window using a predefined gesture of holding the mobile computing device upright and swiping the mobile computing device to the right. In another example, the gesture enabler 216 may determine to enable the mobile computing device to trigger an action of transferring a file to another computing device below the mobile computing device using a predefined gesture of holding the mobile computing device upright above the other computing device and turning the mobile computing device upside down.

The gesture enabler 216 may make the determination to enable a predefined gesture based at least on gesture definition data stored in the gesture database 212 and the indication of the state of the mobile computing device received from the device state detector 214. The gesture enabler 216 may make the determination based on obtaining an indication of a device state from the device state detector 214 and determine one or more particular actions that may be performed by the mobile computing device in the state. For example, the gesture enabler 216 may obtain an indication that a mobile computing device is in a state of receiving a phone call. In response, the gesture enabler 216 may determine that a particular action of answering a phone call may be performed by the mobile computing device in the current state.

In response to determining one or more particular actions that may be performed by the mobile computing device in the current state, the gesture enabler 216 may identify a predefined gesture, defined by the gesture definition data in the gesture database, that is associated with a particular action that the gesture enabler 216 has determined may be performed by the mobile computing device in the state. For example, in response to determining that a phone call may be received, the gesture enabler 216 may identify a gesture associated with answering a phone call is associated with a particular action that the gesture enabler 216 has determined may be performed by the mobile computing device in the current state. Based on the identification, the gesture enabler 216 may determine to enable the identified predefined gesture. For example, based on identifying that the gesture associated with answering a phone call is associated with a particular action that has been determined to be enabled in the current state, the gesture enabler 216 may determine to enable the gesture associated with answering a phone call.

The gesture enabler 216 may provide an indication of a particular gesture that is enabled to the indicator updater 224 and the gesture completion detector 228. For example, gesture enabler 216 may provide an indication that the particular gesture of twisting a mobile computing device ninety degrees in an upright orientation associated with answer a phone call is enabled.

The visual indicator database 218 may be a data store that stores one or more visual indicators. For example, the visual indicator database 218 may store the visual indicators of FIG. 1A. Each visual indicator may be stored with a definition of different representations that are shown for different amounts of progress toward completion of a particular gesture associated with the visual indicator. For example, a visual indicator representing a door may be stored with a definition that the visual indicator initially represents a closed door that progressively opens as a mobile computing device is twisted, until the door is fully open when the mobile computing device is twisted ninety degrees.

The definition of the different representations of a visual indicator may be stored in the form of a sequence of images where each image corresponds to a particular range or percentage of completion of the gesture. For example, the definition may define a first representation as a first image that is shown for 0%-25% completion, a second representation as a second image that is shown for 26%-50% completion, a third representation as a third image that is shown for 51%-75% completion, a fourth representation as a fourth image that is shown for 76%-99% completion, and a fifth representation as a fifth image that is shown for 100% completion. The images may be stored in the form of a graphics interchange format (GIF), Joint Photographic Experts Group (JPEG), Tagged Image File Format (TIFF), Windows bitmap (BMP), Portable Network Graphics (PNG), or some other image file format.

In another example, a definition of the different representations of a visual may be stored in the form of a video where different frames of the video correspond to a particular range or percentage of completion of the gesture. For example, the definition may include a video in the format of AVI, Windows Media Video, QuickTime, OGG, Matroska, RealMedia, Advanced Systems Format, MPEG, Flash Video, or some other format, and a mapping of five different frames of the video to five different ranges of percentage of completion of the gesture.

The orientation and movement detector 220 may detect an orientation and movement of the mobile computing device. For example, the orientation and movement detector may detect that a mobile computing is upright and stationary, the mobile computing device is face-up and being spun, the mobile computing device is being shaken, or some other orientation or movement of the mobile computing device. In some implementations, the orientation and movement detector 220 may include one or more of an accelerometer, a gyroscope, a magnetic sensor, or some other sensor. The orientation and movement detector 220 may provide an indication of the detected orientation and movement to the indicator updater 224 and the gesture completion detector 228. For example, the orientation and movement detector 220 may provide an indication that the mobile computing device is upright and being twisted.

The orientation database and movement database 222 may be a data store that stores orientation and movement data for a mobile computing device. For example, the orientation database and movement database 222 may store an orientation, direction of movement, speed of movement, and acceleration of movement of a mobile computing device at multiple time intervals, e.g., hundredth of a second, twentieth of a second, quarter second, half second, second, two second, or other intervals. The orientation database and movement database 222 may store orientation and movement data for a mobile computing device after an orientation of the mobile computing device is matched to an onset position. For example, the orientation database and movement database 222 may begin storing orientation and movement data for a particular gesture related to flipping a face-down card after a mobile computing device is oriented to be face-down.

The indicator updater 224 may update a visual indicator associated with a particular gesture as a mobile computing device is moved. Initially, the indicator updater 224 may receive gesture definition data of an enabled predefined gesture, determine a visual indicator associated with the enabled predefined gesture based on the gesture definition data, and obtain the visual indicator from the visual indicator database 218. For example, the indicator updater 224 may receive gesture definition data for an enabled predefined gesture with a predefined onset position of orienting the mobile computing device upright, and a predefined motion of twisting the mobile computing device ninety degrees. The indicator updater 224 may determine that the gesture definition data indicates that a visual indicator of an opening door is associated with the predefined gesture. In response, the indicator updater 224 may obtain the visual indicator of an opening door from the visual indicator database 218.

The indicator updater 224 may provide the obtained visual indicator in a graphical user interface displayed on the mobile computing device. For example, the indicator updater 224 may display the visual indicator as a semi-transparent overlay over the entire display, a bottom half of the display, a bottom-left corner of the display, or some other portion of the display. In another example, the indicator updater 224 may display the visual indicator in a new window that is displayed on at least a portion of the display of the mobile computing device.

The indicator updater 224 may update a visual indicator for a predefined gesture based on a current orientation and movement data from the orientation and movement detector 220, and historical orientation and movement data from the orientation and movement database 222. The indicator updater 224 may display an initial representation of a visual indicator in an inactive state until the current orientation and movement data indicates that the current orientation of the mobile computing device matches the onset position of the predefined gesture. The indicator updater 224 may determine that the current orientation and movement data indicates that the current orientation of the mobile computing device matches the onset position of the predefined gesture based on determining that the current orientation and movement data indicates that the current orientation of the mobile computing device is a 99%, 97%, 95%, 90%, or some other percentage, match with the orientation represented by the predefined onset position.

In some implementations, the indicator updater 224 may display the initial representation of the visual indicator in the active state when the orientation of the mobile computing device, when the predefined gesture is first enabled, matches the onset position.

The indicator updater 224 may update the visual indicator based on the orientation and movement data. For example, while movement of the mobile computing device matches the predefined motion associated with the predefined gesture, the indicator updater 224 may update the visual indicator to reflect a progress toward completion of the particular gesture. The indicator updater 224 may update the visual indicator based on a definition of different representations to show for the visual indicator as progress towards completion of the particular gesture changes. For example, the indicator updater 224 may obtain a definition that a visual indicator initially represents a closed door that progressively opens as the phone is twisted until the door is fully open when the mobile computing device is twisted ninety degrees, and update the visual indicator based on an amount of twisting of the mobile computing device indicated by the orientation and movement data. The indicator updater 224 may update the visual indicator based on advancing an image or frame in a sequence of images or frames defined for the visual indicator in the visual indicator database 218.

The gesture completion detector 228 may determine when a predefined gesture with a mobile computing device is completed. The gesture completion detector 228 may determine when a predefined gesture is completed based at least on gesture definition data of an enabled predefined gesture, the current orientation and movement data from the orientation and movement detector 220, and historical orientation and movement data from the orientation and movement database 222.

For example, the gesture completion detector 228 may determine that a predefined gesture of twisting a mobile computing device ninety degrees in an upright position is complete when the historical orientation and movement data stored in the orientation and movement database 222 indicate that the mobile computing device was in an upright position and was twisted ninety degrees while in the upright position.

In some implementations, the gesture completion detector 228 may delete, remove, or ignore historical orientation and movement data that does not match the predefined gesture. For example, where the predefined motion is rotating a mobile computing device from an upright orientation to an upside down orientation, and the historical orientation and movement data indicates the mobile computing device was held upright, turned sideways, and then turned back towards an upright orientation, the gesture completion detector 228 may delete the historical and movement data in the orientation and movement database 222.

The gesture completion detector 228 may provide an indication to the action initiator 230 that a predefined gesture is completed. For example, the gesture completion detector 228 may provide the action initiator 230 an indication that a predefined gesture associated with an action of answering a phone call is complete.

The action initiator 230 may trigger an action based on an indication that a predefined gesture is completed. For example, the action initiator 230 may receive an indication from the gesture completion detector 228 that a predefined gesture associated with an action of answering a phone call is complete. In response, the action initiator 230 may trigger the mobile computing device to answer a phone call. In another example, the action initiator 230 may receive an indication from the gesture completion detector 228 that a predefined gesture associated with an action of transferring a file to a computing device below the mobile computing device is complete. In response, the action initiator 230 may trigger the mobile computing device to being transferring the file to the computing device.

Different configurations of the system 200 may be used where functionality of the gesture database 212, the device state detector 214, the gesture enabler 216, the visual indicator database 218, the orientation and movement detector 220, the orientation and movement database 222, the indicator updater 224, the gesture completion detector 228, and the action initiator 230 may be combined, further separated, distributed, or interchanged. The system 200 may be implemented in a single device or distributed across multiple devices.

Figure 3:
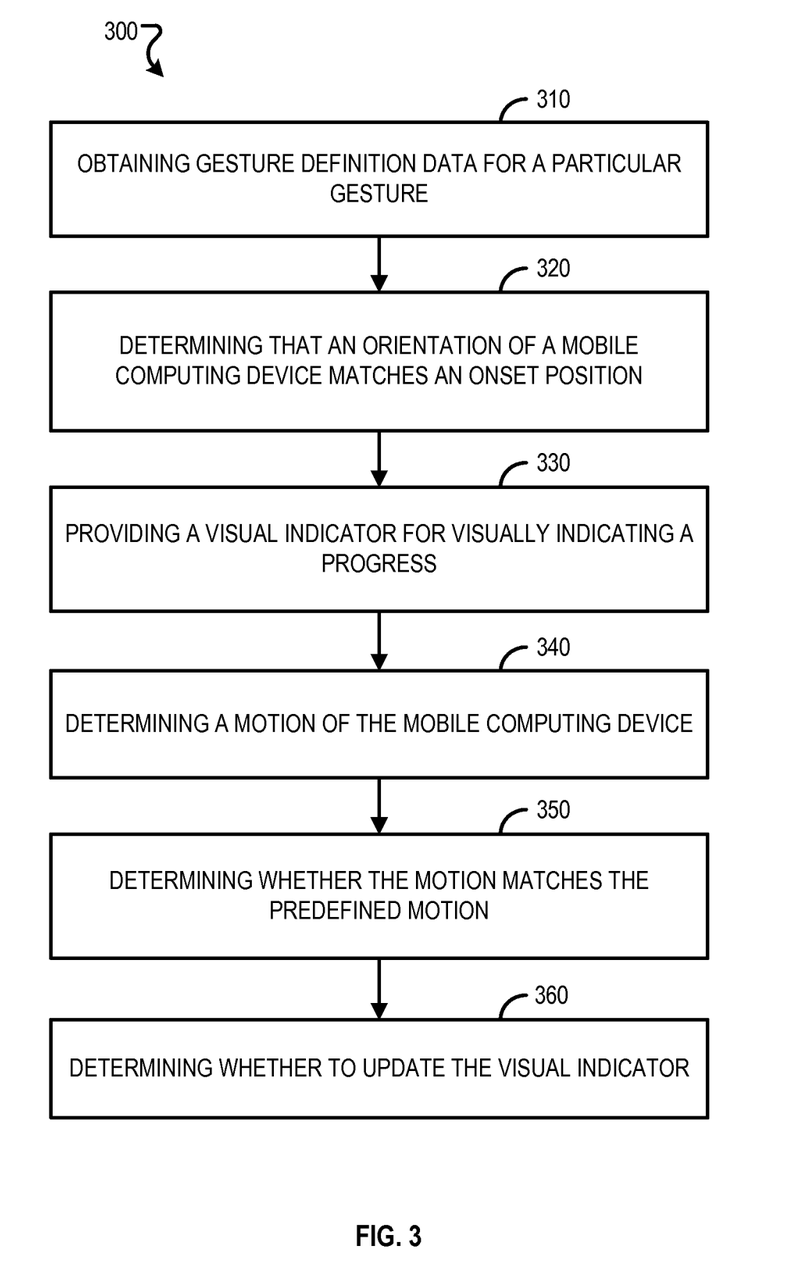
FIG. 3 is a flowchart of an example process for providing gesture discoverability with a mobile computing device.

FIG. 3 is a flowchart of an example process 300 for providing gesture discoverability with a mobile computing device. The following describes the process 300 as being performed by components of the system 200 that is described with reference to FIG. 2. However, the process 300 may be performed by other systems or system configurations.

The process 300 may include obtaining gesture definition data for a particular gesture (310). For example, the gesture enabler 216 may obtain gesture definition data from the gesture database 212. The gesture definition data may define a particular gesture associated with a predefined onset position of orienting the mobile computing device upright, a predefined motion of turning the mobile computing device upside down, a particular action of transferring a file, and a visual indicator that represents a bottle being poured.

The process 300 may include determining that an orientation of a mobile computing device matches an onset position (320). For example, the indicator updater 224 may determine that orientation and movement data from the orientation and movement detector 220 indicates that a mobile computing device is being held at an orientation that matches a predefined onset position. The indicator updater 224 may make the determination in response to gesture enabler 216 determining to enable a predefined gesture and providing an indication of enabling the predefined gesture to the indicator updater 224.

The process 300 may include providing a visual indicator for visually indicating a progress toward completion of the predefined gesture (330). For example, in response to determining that the current orientation of a mobile computing device matches an onset position of orienting the mobile computing device upright, the indicator updater 224 may provide a visual indicator representing an upright bottle in an active state.

The process 300 may include determining a motion of the mobile computing device (340). For example, the orientation and movement detector 220 may detect that a mobile computing device is being turned upside down and provide an indication of the movement to the indicator updater 224.

The process 300 may include determining whether the motion matches the predefined motion (350). For example, the indicator updater 224 may determine that the detected motion of the mobile computing device being turned upside down matches a predefined motion of turning a mobile computing device upside down. In another example, the indicator updater 224 may determine that the detected motion of the mobile computing device being turned upright does not match a predefined motion of turning a mobile computing device upside down.

The process 300 may include determining whether to update the visual indicator (360). For example, in response to a determination that the motion matches the predefined motion, the indicator updater 224 may update the visual indicator to indicate that progress towards completion of the predefined gesture is closer towards completion, e.g., the bottle may be represented as turned even more upside down. In another example, in response to a determination that the motion does not match the predefined motion, the indicator updater 224 may update the visual indicator to indicate that progress towards completion of the predefined gesture is further closer from completion, e.g., the bottle may be represented as less upside down or the visual indicator may be represented in an inactive state.

Figure 4:
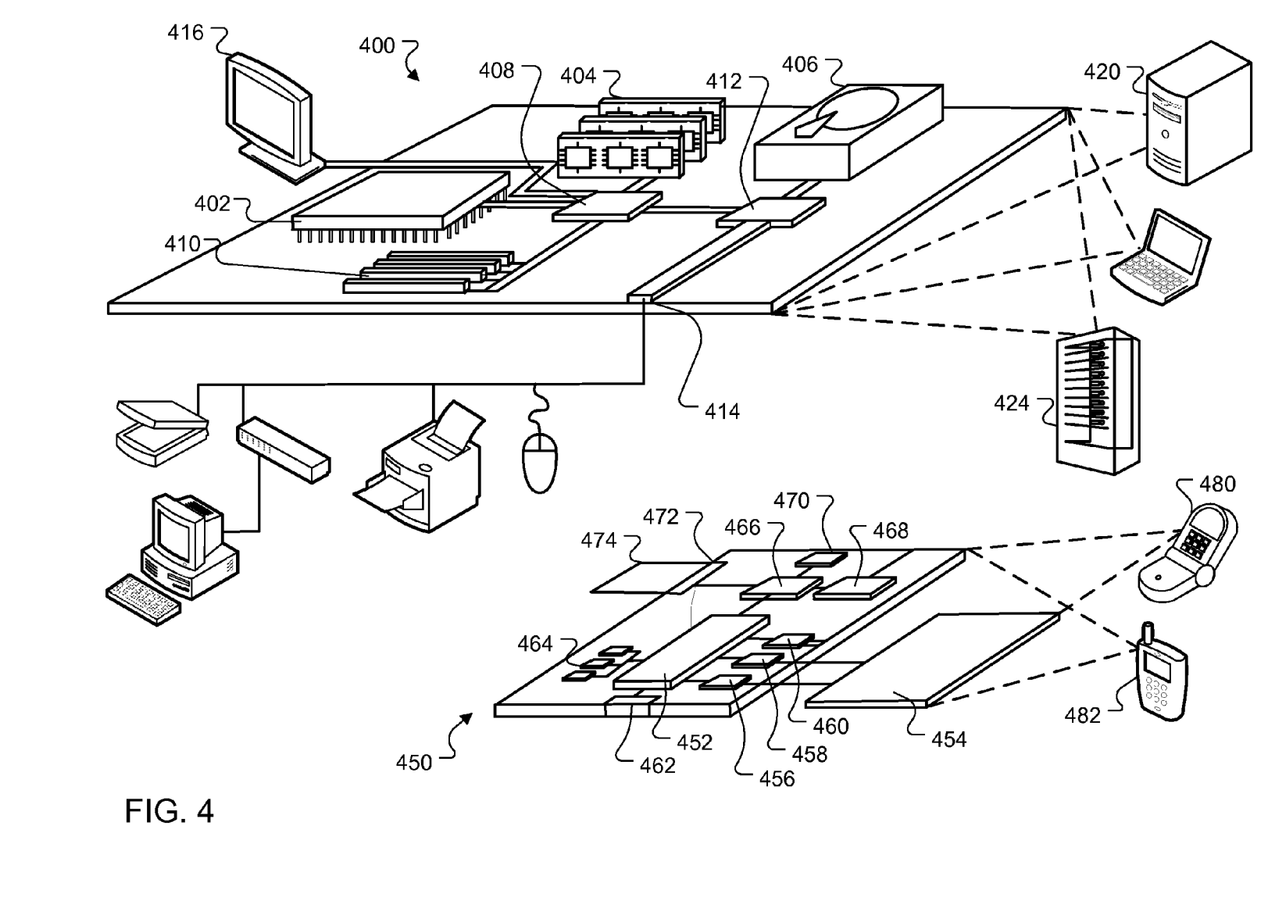
FIG. 4 is a diagram of exemplary computing devices.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile computing devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multiprocessor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile computing device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile computing device.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A computer-implemented method comprising:
    obtaining gesture definition data for a particular gesture, wherein the gesture definition data specifies a predefined onset position associated with commencement of the particular gesture, a predefined motion associated with completion of the particular gesture, a particular action that is triggered upon the completion of the particular gesture, and a visual indicator for visually indicating a progress toward the completion of the particular gesture as the predefined motion is performed, wherein the visual indicator includes a representation of one or more physical objects whose motion, in free space, is associated with the same predefined motion;
    before an orientation of a mobile computing device is determined to match the onset position of the particular gesture, providing, on a graphical user interface of the mobile computing device, the visual indicator in an inactive state that indicates that the orientation of the mobile computing device does not yet match the onset position of the particular gesture;
    after providing, on the graphical user interface of the mobile computing device, the visual indicator in the inactive state that indicates that the orientation of the mobile computing device does not vet match the onset position of the particular gesture, determining that the orientation of a mobile computing device matches the onset position of the particular gesture;
    in response to determining that the orientation of the mobile computing device matches the predefined onset position of the gesture, providing, on the graphical user interface of the mobile computing device, the visual indicator in the active state that indicates that the orientation of the mobile computing device matches the onset position of the particular gesture;
    determining a motion of the mobile computing device;
    determining whether the motion of the mobile computing device matches the predefined motion; and
    in response to determining whether the motion of the mobile computing device matches the predefined motion, determining whether to update the visual indicator to indicate the progress toward completion of the particular gesture.

2. The method of claim 1, wherein determining whether the motion of the mobile computing device matches the predefined motion comprises:
    determining that the motion of the mobile computing device completes the particular gesture; and
    in response to determining that the motion of the mobile computing device completes the particular gesture, triggering the particular action.

3. The method of claim 1, wherein determining whether to update the visual indicator to indicate the progress toward completion of the particular gesture comprises:
    determining to update the visual indicator to indicate an increase in the progress toward completion of the particular gesture based on a determination that the motion of the mobile computing device matches the predefined motion.

4. The method of claim 1, wherein determining whether to update the visual indicator to indicate the progress toward completion of the particular gesture comprises:
    determining to update the visual indicator to indicate the inactive state that indicates that the orientation of the mobile computing device does not match the particular gesture based on a determination that the motion of the mobile computing device does not match the predefined motion.

5. The method of claim 1, wherein the particular gesture comprises holding the mobile computing device upright and turning the mobile computing device counterclockwise until the mobile computing device is upside down, and the visual indicator comprises a representation of a bottle being poured.

6. A system comprising:
one or more computers; and
one or more storage devices storing instructions that are operable, when executed by the one or more computers, to cause the one or more computers to perform operations comprising:
obtaining gesture definition data for a particular gesture, wherein the gesture definition data specifies a predefined onset position associated with commencement of the particular gesture, a predefined motion associated with completion of the particular gesture, a particular action that is triggered upon the completion of the particular gesture, and a visual indicator for visually indicating a progress toward the completion of the particular gesture as the predefined motion is performed, wherein the visual indicator includes a representation of one or more physical objects whose motion, in free space, is associated with the same predefined motion;
before an orientation of a mobile computing device is determined to match the onset position of the particular gesture, providing, on a graphical user interface of the mobile computing device, the visual indicator in an inactive state that indicates that the orientation of the mobile computing device does not yet match the onset position of the particular gesture;
after providing, on the graphical user interface of the mobile computing device, the visual indicator in the inactive state that indicates that the orientation of the mobile computing device does not yet match the onset position of the particular gesture, determining that the orientation of a mobile computing device matches the onset position of the particular gesture;
in response to determining that the orientation of the mobile computing device matches the predefined onset position of the gesture, providing, on the graphical user interface of the mobile computing device, the visual indicator in the active state that indicates that the orientation of the mobile computing device matches the onset position of the particular gesture;
determining a motion of the mobile computing device;
determining whether the motion of the mobile computing device matches the predefined motion; and
in response to determining whether the motion of the mobile computing device matches the predefined motion, determining whether to update the visual indicator to indicate the progress toward completion of the particular gesture.

7. The system of claim 6, wherein determining whether the motion of the mobile computing device matches the predefined motion comprises:
determining that the motion of the mobile computing device completes the particular gesture; and
in response to determining that the motion of the mobile computing device completes the particular gesture, triggering the particular action.

8. The system of claim 6, wherein determining whether to update the visual indicator to indicate the progress toward completion of the particular gesture comprises:
determining to update the visual indicator to indicate an increase in the progress toward completion of the particular gesture based on a determination that the motion of the mobile computing device matches the predefined motion.

9. The system of claim 6, wherein determining whether to update the visual indicator to indicate the progress toward completion of the particular gesture comprises:
determining to update the visual indicator to indicate the inactive state that indicates that the orientation of the mobile computing device does not match the particular gesture based on a determination that the motion of the mobile computing device does not match the predefined motion.

10. The system of claim 6, wherein the particular gesture comprises holding the mobile computing device upright and turning the mobile computing device counterclockwise until the mobile computing device is upside down, and the visual indicator comprises a representation of a bottle being poured.

11. A non-transitory computer-readable medium storing instructions executable by one or more computers which, upon such execution, cause the one or more computers to perform operations comprising:
obtaining gesture definition data for a particular gesture, wherein the gesture definition data specifies a predefined onset position associated with commencement of the particular gesture, a predefined motion associated with completion of the particular gesture, a particular action that is triggered upon the completion of the particular gesture, and a visual indicator for visually indicating a progress toward the completion of the particular gesture as the predefined motion is performed, wherein the visual indicator includes a representation of one or more physical objects whose motion, in free space, is associated with the same predefined motion;
before an orientation of a mobile computing device is determined to match the onset position of the particular gesture, providing, on a graphical user interface of the mobile computing device, the visual indicator in an inactive state that indicates that the orientation of the mobile computing device does not yet match the onset position of the particular gesture;
after providing, on the graphical user interface of the mobile computing device, the visual indicator in the inactive state that indicates that the orientation of the mobile computing device does not yet match the onset position of the particular gesture, determining that the orientation of a mobile computing device matches the onset position of the particular gesture;
in response to determining that the orientation of the mobile computing device matches the predefined onset position of the gesture, providing, on the graphical user interface of the mobile computing device, the visual indicator in the active state that indicates that the orientation of the mobile computing device matches the onset position of the particular gesture;
determining a motion of the mobile computing device;
determining whether the motion of the mobile computing device matches the predefined motion; and
in response to determining whether the motion of the mobile computing device matches the predefined motion, determining whether to update the visual indicator to indicate the progress toward completion of the particular gesture.

12. The medium of claim 11, wherein determining whether the motion of the mobile computing device matches the predefined motion comprises:

determining that the motion of the mobile computing device completes the particular gesture; and in response to determining that the motion of the mobile computing device completes the particular gesture, triggering the particular action.

13. The medium of claim 11, wherein determining whether to update the visual indicator to indicate the progress toward completion of the particular gesture comprises:

determining to update the visual indicator to indicate an increase in the progress toward completion of the particular gesture based on a determination that the motion of the mobile computing device matches the predefined motion.

14. The medium of claim 11, wherein determining whether to update the visual indicator to indicate the progress toward completion of the particular gesture comprises:

determining to update the visual indicator to indicate an inactive the inactive state that indicates that the orientation of the mobile computing device does not match the particular gesture based on a determination that the motion of the mobile computing device does not match the predefined motion.

\* \* \* \* \*